Oct. 19, 1965 J. L. DAVIS 3,212,939

METHOD OF LOWERING THE SURFACE RECOMBINATION VELOCITY OF INDIUM ANTIMONIDE CRYSTALS

Filed Dec. 6, 1961

INVENTOR.
JOHN L. DAVIS
BY Q. Baxter Warner
Hodges ATTYS.
L. McDalgarn AGENT.

United States Patent Office 3,212,939

Patented Oct. 19, 1965

3,212,939

METHOD OF LOWERING THE SURFACE RECOMBINATION VELOCITY OF INDIUM ANTIMONIDE CRYSTALS

John L. Davis, West Hyattsville, Md., assignor to the United States of America as represented by the Secretary of the Navy Filed Dec. 6, 1961, Ser. No. 157,605
2 Claims. (Cl. 148—1.5)
(Granted under Title 35, U.S. Code (1952), sec. 266)

Figure 1:
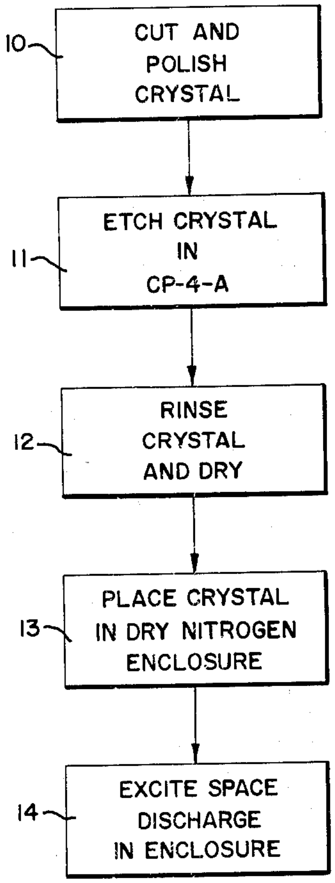

The invention described herein may be manufactured and used by or for the Government of the United States of America for governmental purposes without the payment of any royalties thereon or therefor.

This invention relates to a method of improving the response of semiconductors, and particularly to a method of lowering the surface recombination velocity on an indium antimonide crystal.

When an external source of energy is applied to a semiconductor crystal, carriers are produced within the crystal lattice increasing conduction through the crystal. In certain semiconductor substance, such as indium antimonide, the semiconductor crystal responds to different wavelengths of light; when light impinges upon the semiconductor, the energy therefrom can change the energy of electrons within the crystal thereby producing excess conduction band electrons and holes which are free to wander about the crystal lattice. The excitation of an electron from the valence into the conduction band is, however, not a permanent change. The electron once excited tends to fall back into its former lower energy state, which is the equilibrium condition in the semiconductor crystal; this process is known as recombination. For a given intensity of light impinging upon the semiconductor, the number of excess carriers present therein will continue to increase until a state of equilibrium is reached in which the rate of production of carriers is equal to the rate of recombination.

The effect of recombination within a semiconductor crystal can be much lower than the effect of recombination at the surface of the crystal. The rate of recombination within the crystal, known as bulk recombination rate, depends upon the processes whereby an electron makes a transition between the conduction and the valence band. The direct transition between the conduction band and the valence band is a relatively unlikely process. However, a recombination by some indirect processes may be possible; then the probability of a particular carrier recombining is increased, thereby increasing the recombination rate. Certain imperfections in the crystal lattice establish an intermediate energy level between the valence and conduction bands into which a carrier may fall; these imperfections are known as recombination centers and have the effect of increasing the recombination rate since the existence of recombination centers allow the recombination to take place in a two-step process whereby the electron falls from the conduction band into the intermediate recombination energy level established by the recombination centers and from there into the valence band. The existence of these recombination centers within the interior of the semiconductor is rare due to the regularity of the crystal lattice below the surface; however, the surface of a semiconductor may contain a relatively large number of these recombination centers due to irregularities and cracks in the crystal surface, such as are caused by cutting and grinding of the crystal.

Various experimental attempts to measure the bulk lifetime of added carriers in n-type indium antimonide have produced doubtful results due to the high surface recombination velocity of the samples. The carriers produced in the sample migrate toward the surface where they are quickly recombined due to the large number of recombination centers which exist on the surface. The high velocity of surface recombination also effects the response of the semiconductor in practical applications. It may easily be seen that the number of carriers produced by a given intensity of light will be increased if the total rate of recombination can be reduced. Certain methods such as the use of etching materials to remove large irregularities in the crystal face have proved helpful to some extent; however, the surface recombination velocity remained sufficiently high to have adverse effects on the response of the semiconductor crystal.

An object of this invention is to provide a method of treating the surface of the semiconductor to thereby reduce the surface recombination velocity of the semiconductor.

Another object of this invention is to provide an indium antimonide crystal having improved response characteristics due to the low surface recombination velocity of the surface of the crystal.

A further object of this invention is to produce a low, uniform surface recombination velocity of the (1–1–1) face of indium antimonide crystals so that the bulk lifetime of the carriers within the crystals may be accurately determined.

Figure 2:
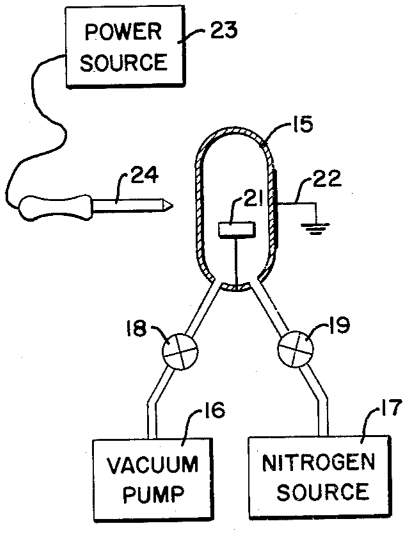

Other objects and many of the attendant advantages of this invention will be readily appreciated as the same becomes better understood by reference to the following detailed description when considered in connection with the accompanying drawings wherein:

FIG. 1 is a step by step diagram of the method used in the present invention; and FIG. 2 is a schematic diagram of one arrangement of equipment used in the practice of this invention.

The first step in producing indium antimonide or other semiconductor crystals for use in sensing electromagnetic radiation or for making other measurements is the cutting and polishing of the crystal 10. The particular piece of crystal is cut from a larger block by any of a number of well known methods to provide an active surface, in this case along the (1–1–1) crystal face. The indium antimonide crystal may then be polished to remove any large irregularities in the surface resulting from the cutting process. This cut and polished crystal of n-type indium antimonide if etched in the ordinary manner, will have a surface recombination velocity $s$ in the order of $10^4$ centimeters per second, which will vary with time and from point to point on the crystal sample surfaces. In this state it is extremely difficult to measure the bulk lifetime of the added carriers in the n-type indium antimonide because of the uncontrollable surface effects.

The next step in producing an improved semiconductor surface is the etching of the crystal surfaces 11 in an etching solution to thereby remove the small irregularities in the crystal surface which are present after the initial step of cutting and polishing 10. Many crystal etching solutions are well known in the art and usually consist of a strong acid solution which reacts with the crystal surface to remove the rough and damaged layers. One of the most useful of these etching solutions in the particular etching process of this invention is that commonly known as CP-4-A, which consists of 15 parts of $CH_2COOH$, 25 parts of concentrated nitric acid, and 15 parts of 48% hydrofluoric acid.

An additional example of a suitable etching solution for the crystal surface would be a mixture of hydrofluoric acid and hydrogen peroxide. The etching of the crystal is performed by placing the crystal in a small beaker or other container and covering the entire crystal with the appropriate etching solution so that the crystal is entirely immersed therein. The crystal is allowed to remain in the etching solution until a sufficient portion of the surface has been etched away so that the surface irregularities caused by grinding and cutting are removed.

When the desired surface smoothness has been attained by the action of the etching solution, the next step 12 is to rinse and dry the crystal. Large quantities of demineralized water or its equivalent are added to the beaker to dilute and displace the etching solution from the crystal surface without allowing the crystal surface to come in contact with the surrounding air. The beaker is filled to overflowing a number of times and emptied partially so that at the end of the rinsing process the concentration of the etching solution in the fluid covering the crystal is negligible. Next methyl alcohol or its equivalent is added in large quantities, by filling and partially emptying the beaker as before to remove and displace the water from the surface of the crystal until the concentration of water in the immersing fluid is negligible. The methyl alcohol provides a drying agent for the crystal which will not oxidize the crystal surface, as would the water, if allowed to remain on the crystal surface. Thus the crystal surface is etched to a highly polished state without the surface ever coming into contact with the outside air with either the etching solution or the water present thereon; this is important. The polishing of the crystal surface in this manner removes most of the surface irregularities which produced recombination centers and the surface recombination velocity has been lowered, compared with ordinary etching, by a factor of two to three times to a velocity on the order of $4 \times 10^3$ centimeters per second at 77° K.

The dried crystal is now prepared to have the necessary operating leads soldered thereto; this is better done at this time than after the completion of the entire process.

FIG. 2 shows schematically the arrangement of the equipment necessary to a completion of the process. An airtight enclosure 15 constructed in part of a non-conducting material through which an electric discharge may be excited such as glass, is connected both to a vacuum pump 16 and a source 17 of dry nitrogen gas or other suitable gas, such as helium or argon, through appropriate valves 18 and 19 respectively. The crystal sample with the polished and etched surfaces is mounted within the enclosure 15 and the enclosure is then sealed. The space within the enclosure 15 is now evacuated by the vacuum pump 16 to remove the air therein. The space within the enclosure may be the vacuum space of a Joule-Thompson cryostat so that the response of the crystal may be measured at the 77° K. after completion of the process without removing the crystal from the enclosure. The valve 18 is closed and the valve 19 is opened to admit the dry nitrogen gas from the source 17 into the evacuated chamber 15. The nitrogen is dried by passage through a low temperature moisture trap (not shown). The particular amount, temperature and pressure of the nitrogen gas within the chamber 15 is not critical but is simply that amount normally at room temperature which will maintain a glow discharge as will later be explained in greater detail. A portion of the chamber 15 is adjacent a piece of metal 22 which is electrically grounded so that when the high frequency power from a source 23 is delivered to a probe of a Tesla coil 24 and the probe is placed in close proximity to the enclosure 15 opposite the electrical ground 22, a glow discharge takes place within the nitrogen filled chamber and in contact with the sample. This glow discharge is maintained for a period of from 30 to 60 seconds completing the process. The resulting surface recombination velocity on the crystal surface has now been reduced to approximately 200 centimeters per second or less, which is low enough to make surface effects on the (1-1-1) n-type indium antimonide sample almost negligible. Also the uniformity of the low surface recombination velocity obtained is substantially improved over the entire surface of the sample. The reason why the use of the glow discharge produces such great effects on the surface recombination velocity is not at present known; however, it is believed that some sort of inversion layer is created at the surface of the sample thus producing a permanent electric field thereon. This electric field, if produced, would serve to repel the carriers of like charge and prevent their migration to the surface of the sample. Thus if one type of carrier is prevented from reaching the surface, it will not be available thereat for recombination with those carriers of the other charge. With the low surface recombination velocity established on a given sample of n-type indium antimonide, measurements and studies of the bulk lifetime of added carriers may be carried out with greatly increased accuracy and results. Also, the indium antimonide exhibits improved response as an electromagnetic wave sensing element when put to practical use.

The treated crystal is usually tested within the enclosure. If removal is necessary, the application of a covering material would prove helpful in maintaining the improved surface by preventing contact with oxidizing air.

The values obtained in the practice of this invention on the (1-1-1) surface of n-type indium antimonide are given by way of example only and are not intended as a limitation upon the practice of this invention on other semiconductor materials of various types or on other crystal faces.

It will be understood that various changes in the details, materials, and arrangements which have been herein described and illustrated may be made by those skilled in the art within the principle and scope of the invention as expressed in the appended claims.

What is claimed is:

1. The process of producing a uniform low surface recombination velocity on the (1-1-1) face of an indium antimonide crystal comprising the steps of immersing said crystal in a solution of CP-4-A to remove surface irregularities, diluting said solution with large quantities of first demineralized water and next methyl alcohol to remove said solution while maintaining said crystal immersed throughout the above steps in said process, removing said crystal from immersion, placing said crystal in a glass enclosure containing a dry nitrogen atmosphere and exciting a glow discharge in said atmosphere and in close proximity to the 1-1-1 face of said crystal for a time sufficient to substantially reduce the surface recombination velocity of said crystal.

2. The method of producing a low surface recombination velocity for an indium antimonide crystal comprising the steps of etching the surface of said crystal in a strong acid solution, diluting said acid solution with large quantities of demineralized water while maintaining said surface totally mmersed therein, diluting said demineralized water with large quantities of methyl alcohol to remove said water from the surface of said crystal before exposing the crystal surface to air, placing said indium antimonide crystal within an enclosure containing dry nitrogen gas, and producing a glow discharge within said enclosure and in close proximity to the surface of said crystal for a time sufficient to substantially reduce the surface recombination velocity of said crystal.

References Cited by the Examiner

UNITED STATES PATENTS

| | | | |
|---|---|---|---|
| 2,750,544 | 6/56 | Pfann | 317—240 |
| 2,763,581 | 9/56 | Freedman | 148—1.5 |
| 2,771,568 | 11/56 | Steigerwald. | |
| 2,899,344 | 11/59 | Atalla | 156—17 X |
| 3,105,784 | 10/63 | Topas | 157—17 |
| 3,115,424 | 12/63 | Eannarino | 156—17 X |

OTHER REFERENCES

Fan, "The Transition From Glow Discharge to Arc," Physical Review, vol. 55, Apr. 15, 1939, pp. 769–775.

Haneman, "Behavior of InSb Surfaces During Heat Treatment," Journal of Applied Physics, vol. 31, Jan. 1960, pp. 217–218.

DAVID L. RECK, *Primary Examiner.*

HYLAND BIZOT, *Examiner.*